United States Patent
Collin (10) Patent No.: US 10,399,035 B2
(45) Date of Patent: Sep. 3, 2019

(54) COMPOSITION MADE FROM UREA FOR TREATING EXHAUST GASES

(71) Applicant: TOTAL MARKETING SERVICES, Puteaux (FR)

(72) Inventor: Annabelle Collin, Lyons (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 15/778,604

(22) PCT Filed: Nov. 28, 2016

(86) PCT No.: PCT/FR2016/053118
§ 371 (c)(1),
(2) Date: May 23, 2018

(87) PCT Pub. No.: WO2017/093644
PCT Pub. Date: Jun. 8, 2017

(65) Prior Publication Data
US 2018/0353904 A1    Dec. 13, 2018

(30) Foreign Application Priority Data

Dec. 2, 2015 (FR) ..................... 15 61762

(51) Int. Cl.
*B01D 53/94* (2006.01)
*F01N 3/20* (2006.01)

(52) U.S. Cl.
CPC ....... *B01D 53/9409* (2013.01); *F01N 3/2066* (2013.01); *B01D 2251/206* (2013.01); *B01D 2251/208* (2013.01); *B01D 2251/2067* (2013.01); *F01N 2610/02* (2013.01); *F01N 2610/03* (2013.01); *Y02T 10/24* (2013.01)

(58) Field of Classification Search
None
See application file for complete search history.

(56) References Cited

U.S. PATENT DOCUMENTS

| 5,809,774 A | 9/1998 | Peter-Hoblyn et al. |
|---|---|---|
| 6,003,303 A | 12/1999 | Peter-Hoblyn et al. |
| 2003/0226312 A1 | 12/2003 | Roos et al. |
| 2010/0015022 A1 | 1/2010 | Schmelzle et al. |
| 2011/0233461 A1 | 9/2011 | Wasow et al. |
| 2012/0219485 A1 | 8/2012 | Sebelius |

FOREIGN PATENT DOCUMENTS

| DE | 102008041903 A1 | 3/2010 |
|---|---|---|
| JP | 2007-145796 A | 6/2007 |
| WO | 95/06805 A1 | 3/1995 |
| WO | 2008/125745 A2 | 10/2008 |
| WO | 2010/044676 A1 | 4/2010 |
| WO | 2011/046491 A1 | 4/2011 |

OTHER PUBLICATIONS

Feb. 24, 2017 Search Report issued in International Patent Application No. PCT/FR2016/053118.
Feb. 24, 2017 Written Opinion issued in International Patent Application No. PCT/FR2016/053118.

*Primary Examiner* — Sheng H Davis
(74) *Attorney, Agent, or Firm* — Oliff PLC (57) ABSTRACT

An aqueous composition including an NOx reducing agent or a precursor of such an agent, in particular urea, and at least one paraffin dispersed in the aqueous phase. Such a composition can be used for reducing the formation of deposits in an SCR exhaust system while preventing foaming during the handling of same.

20 Claims, 2 Drawing Sheets

COMPOSITION MADE FROM UREA FOR TREATING EXHAUST GASES

The present invention relates to a composition for the treatment of exhaust gases at the outlet of on-board or stationary diesel engines. It also relates to its use in any device for the treatment of these exhaust gases, whether the engines are heavy duty engines or engines for light vehicles or else engines for stationary industrial applications.

STATE OF THE PRIOR ART

European standards as regards pollution for diesel fuels, in particular those applicable to heavy duty vehicles, have led engine manufacturers to introduce exhaust gas post-treatments. These post-treatments include the SCR (Selective Catalytic Reducer), EGR (Exhaust Gas Recirculation) and PF (Particulate Filter) technologies. These various post-treatments can be installed alone or in combination, insofar as they do not always act on the same contaminants present in the exhaust gases.

In order to meet the standard, in particular the standard Euro 6, which applies in Europe to all vehicles from 1 Sep. 2015, the majority of European manufacturers of motor vehicles have opted for the SCR post-treatment in the exhausts of their engines, this post-treatment acting exclusively on decreasing the nitrogen oxides present in the gases. Another advantage of this technique is that it makes possible, by optimized adjustments of the engine, a substantial reduction in the consumption of the fuel.

The SCR post-treatment consists in reducing the NOx or nitrogen oxides (NO, $NO_2$) over a catalyst containing platinum and palladium, and in the presence of a reducing agent, generally gaseous ammonia. In order to introduce gaseous ammonia into the exhaust, it is known to produce it directly in the pipe before the SCR system by vaporizing an aqueous urea solution. The urea, which is injected at a mean temperature generally oscillating from 150° C. to 400° C., gradually hydrolyzes to give gaseous ammonia. Optionally, other agents which are precursors of ammonia can be employed under similar conditions.

In certain installation configurations of the SCR and of the injection of ammonia precursor, in particular of the injection of urea, manufacturers have observed the appearance of deposits in the exhaust pipes before the inlet of the SCR. These deposits can be sufficiently great to bring about partial, indeed even complete, sealing of the exhaust pipe related to the back pressure at the exhaust and can thus create losses in power of the engine. At a constant injection configuration, the amount of deposits formed is greater at low temperatures than at high temperatures. These deposits, according to the analyses which have been carried out, are predominantly composed of cyanuric acid resulting from the incomplete decomposition of the urea. This cyanuric acid can sublime and again produce gaseous ammonia. However, this reaction can only take place at a very high temperature, of greater than 450° C., a temperature rarely achieved at this point in the exhaust pipes.

In particular, it has been found that these deposits are present in the pipes exhibiting bends as a result of the lack of space in the vehicle, and when the distance separating the injection of urea and the first bend is too short. The hypothesis formulated is that, in this type of configuration, a portion of the water drops does not have the time to vaporize and decompose completely to give aqueous ammonia. The drops of urea are deposited on the wall of the pipe, which is at too low a temperature to allow the complete decomposition to give gaseous ammonia, and they only partially decompose, forming deposits of cyanuric acid stuck to the wall. Furthermore, it has also been observed that, depending on the configuration of the SCR line, the urea is liable to crystallize in the line, with the consequence of a blockage of the line.

WO2008/125745 describes an aqueous solution comprising a major portion of a constituent liable to release gaseous ammonia above 200° C. and a minor portion of at least one polyfunctional additive, the HLB of which varies from 7 to 17, in order to limit the formation of the deposits based on cyanuric acid in any spray device targeting the post-treatment of the exhaust gases, more particularly SCR devices. The polyfunctional additives employed are in particular polyalkoxylated fatty alcohol ethers and polyalkoxylated fatty alcohol esters.

EP 2 337 625 describes a mixture of surfactants which makes it possible to reduce the diameter of the droplets of an aqueous urea solution and to thus promote its vaporization and the conversion of the urea into gaseous ammonia in an SCR system. The solution provided consists of a mixture of polyalkoxylated fatty alcohols, with controlled degrees of alkoxylation.

EP 2 488 283 describes additives for a urea solution of the type of specific polyalkoxylated fatty alcohols. These additives are also intended to promote a reduction in the formation of the deposits resulting from the decomposition of the urea in the SCR systems.

However, it has been found that some additivated solutions of ammonia precursor, in particular of urea, when they are introduced into the tank, have a tendency to foam. This foaming interferes with the filling of the tank and can result in it overflowing. In addition, this foaming can lead to the injection of air into the system. This phenomenon disrupts the monitoring of the amount of solution injected.

One of the solutions to this problem consists in adding antifoaming agents. However, such additives represent a not insignificant additional cost.

The need thus remains for an additive for aqueous solutions based on a reducing agent for NOx, for example ammonia, or on a precursor of said reducing agent, such as urea, which makes it possible to form a composition with the optimized properties for use on an SCR line. This composition is expected to be capable of preventing or reducing the deposits during use on an SCR line. This composition is also expected to exhibit a reduced foaming in comparison with the additivated compositions based on a reducing agent for NOx or on a precursor of said reducing agent, such as urea, of the prior art. This composition is also expected to make possible precise metering of the amounts of composition injected.

The document DE 10 2008 041 903 describes a composition for the treatment of exhaust gases comprising NOx, this aqueous composition comprising a reducing agent for NOx or a precursor of a reducing agent for NOx and a solvent having a melting point lower than that of the aqueous solution. The composition is an emulsion based on hydrocarbons and on a urea solution, the hydrocarbon phase forming the continuous phase. This emulsion avoids the effects of the cooling of the urea solution, such as the problems of fluidity and the difficulties in pumping this solution.

The document US 2003/0226312 describes an aqueous composition for improving the treatment of exhaust gases, this composition comprising a metal compound. The composition is introduced, either into the combustion chamber in the form of an emulsion with the fuel, or as an emulsion or alone in the form of an aqueous stream into the exhaust gas.

The metal compound neutralizes the secondary products from the combustion. When an emulsion is used, it is a water-in-fuel emulsion.

The document U.S. Pat. No. 5,809,774 describes a process for reducing the emissions of NOx in a diesel engine, this process comprising the formation of an emulsion of an aqueous composition of a reducing agent for NOx in a fuel, the composition being separated (by settling) into its two main constituents before use. The fuel portion is then injected into the engine and the aqueous solution of a reducing agent for NOx is injected into the exhaust gases. This invention is targeted at reducing items of storage equipment.

SUMMARY OF THE INVENTION

The invention relates to an aqueous composition comprising a reducing agent for NOx or a precursor of a reducing agent for NOx, in particular urea, characterized in that it comprises at least one paraffin dispersed in the aqueous phase.

The invention relates in particular to an aqueous composition comprising at least one reducing agent for NOx or one precursor of a reducing agent for NOx, characterized in that it comprises at least one paraffin dispersed in the aqueous phase, said paraffin representing from 50 to 10 000 ppm by weight, with respect to the weight of reducing agent for NOx or with respect to the weight of precursor of reducing agent for NOx.

According to a preferred embodiment, the precursor of the reducing agent for NOx is urea.

According to a preferred embodiment, the $C_{20}$-$C_{36}$ paraffins represent at least 90% by weight, with respect to the total weight of paraffins in the composition.

According to a preferred embodiment, the composition comprises at least one surfactant, and optionally a stabilizing agent for the emulsions.

According to a preferred embodiment, the composition comprises at least one nonionic surfactant.

According to a preferred embodiment, the composition comprises at least one nonionic surfactant chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

According to a more preferred embodiment, the nonionic surfactant is chosen from polyethoxylated sorbitans and polyethoxylated isosorbides.

According to a preferred embodiment, the oxygen-comprising $C_4$-$C_{20}$ hydrocarbon surfactants comprising one or two furanose or pyranose rings, and one or more mono- or polyalkoxylated hydroxyl groups, are present in amounts ranging from 1% to 70% by weight, with respect to the total weight of paraffins in the composition.

According to a preferred embodiment, the composition additionally comprises at least one stabilizing agent for emulsions chosen from fatty acids.

According to a preferred embodiment, the fatty acid is present in amounts ranging from 1% to 50% by weight, with respect to the total weight of paraffins in the composition.

According to another preferred embodiment, the composition comprises at least one nonionic surfactant chosen from esters of fatty acids and of oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

According to a more preferred embodiment, the nonionic surfactant or surfactants are chosen from esters of fatty acids and of mono- or polyethoxylated sorbitans and esters of fatty acids and of mono- or polyethoxylated isosorbides.

According to a preferred embodiment, the esters of fatty acids and of oxygen-comprising $C_4$-$C_{20}$ hydrocarbon molecules comprising one or two furanose or pyranose rings, and one or more mono- or polyalkoxylated hydroxyl groups, are present in amounts ranging from 1% to 70% by weight, with respect to the total weight of paraffins in the composition.

According to a preferred embodiment, the composition comprises at least:
  a nonionic surfactant chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group,
  an emulsion stabilizer chosen in particular from $C_8$-$C_{30}$ fatty acids,
  and
  a nonionic surfactant chosen from esters of fatty acids and of oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

According to a preferred embodiment, the composition comprises at least:
  a nonionic surfactant chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group,
  an emulsion stabilizer chosen in particular from $C_8$-$C_{30}$ fatty acids,
  and
  a nonionic surfactant chosen from esters of fatty acids and of oxygen-comprising $C_4$-$C_{20}$ hydrocarbon molecules comprising one or two furanose or pyranose rings, and one or more hydroxyl groups.

According to a preferred embodiment, the combined surfactants and emulsion stabilizers represent from 1% to 100% by weight, with respect to the total weight of paraffin(s) in the composition.

The invention also relates to the use of a composition as defined above in the post-treatment of exhaust gases by a Selective Catalytic Reducer (SCR) catalyst.

According to a preferred embodiment, the composition is used to avert, limit or prevent the formation of deposits in an SCR exhaust line.

The invention also relates to the use of a composition as defined above to avoid or reduce foaming during the filling of a tank with the composition.

The invention also relates to a process for the treatment of exhaust gases in an internal combustion engine, preferably a diesel engine, equipped with an SCR system, this process being characterized in that it comprises at least one stage of introduction of a composition as defined above into the SCR line, upstream of the SCR system.

The invention also relates to a process for reducing the deposits in an SCR line, this process being characterized in that it comprises at least one stage of introduction of a composition as defined above into the SCR line, upstream of the SCR system.

According to a preferred embodiment, the process comprises a stage of preparation of an aqueous composition, as defined above, of a reducing agent for NOx, or of a precursor of a reducing agent for NOx, and of paraffin(s).

The invention also relates to the use of an aqueous emulsion or dispersion or suspension of paraffin as additive in an aqueous solution of a reducing agent for NOx or of a precursor of a reducing agent for NOx, for the purpose of employment in an SCR system, said paraffin representing from 50 to 10 000 ppm by weight, with respect to the weight of reducing agent for NOx or with respect to the weight of precursor of reducing agent for NOx, the paraffin being used, in particular, emulsified or dispersed or suspended in the aqueous phase.

The compositions of the invention have numerous advantages: they can be used in the same way and in the same items of equipment as the solutions of the prior art. They are at least as effective, indeed for some more effective, than the solutions of the prior art, in particular the solutions based on urea, in the reduction or the prevention of the formation of deposits in SCR systems. They result in little or no foaming during the handling thereof and thus make it possible to prevent overflows during the filling of the tank. They are stable on storage. They make possible precise control of the amount of composition injected.

DETAILED DESCRIPTION

The invention is based on the development of aqueous compositions comprising a reducing agent for NOx or a precursor of a reducing agent for NOx, in particular urea, and additionally comprising one or more paraffins dispersed in said composition. This dispersion is advantageously stabilized by means of one or more surfactants, preferably nonionic surfactants.

In the present application, the terms "dispersion" or "dispersed" employed to denote paraffin-comprising aqueous compositions also include emulsions, suspensions and more generally any composition form in which the paraffin and the water form a substantially homogeneous mixture.

The Reducing Agent for the NOx or the Precursor of Said Agent:

The composition is prepared from an aqueous solution comprising at least one reducing agent for NOx or at least one precursor of said agent.

"Reducing agent for NOx" is understood to mean a compound capable, at least partially, if not completely, of reducing the NOx to give gaseous ammonia under the conditions of operation of an SCR line, that is to say at a temperature ranging from 150° C. to 400° C. Ammonia may be mentioned among the reducing agents for NOx.

"Precursor of a reducing agent for NOx" is understood to mean a compound liable to release the reducing agent for NOx under the effect of the temperature and/or by catalytic reaction. Mention may be made, among the ammonia precursors, of urea, which, by a hydrolysis reaction, produces ammonia (reducing agent for NOx) according to a well-known process. An SCR exhaust line can comprise a catalyst upstream of the SCR catalytic system, the role of which catalyst is to convert a precursor of a reducing agent for NOx into a reducing agent for NOx, in particular into gaseous ammonia.

Advantageously, the composition is prepared from an aqueous urea solution. This is because urea exhibits the advantage of being stable, nonvolatile, nonexplosive and nonflammable. It can be transported without risk, and stored and handled by an operator without specific training.

Usually, the solution employed in SCR lines comprises 32.5% by weight of urea, so as to satisfy the standard ISO 22241-1 relating to the reduction of NOx in diesel engines.

For this use, provision is thus made for the composition to exhibit a urea concentration substantially equal to 32.5% by weight. However, it is also within the scope of the present invention to prepare aqueous compositions based on urea with a concentration of greater than 32.5%, which are diluted before use. This alternative form makes it possible to achieve economies during the transportation of these urea-based compositions.

The Paraffins:

The composition additionally comprises at least one paraffin.

The paraffins are alkanes, the empirical formula of which is $C_nH_{2n+2}$, with n an integer ranging from 8 to 40. They include normal paraffins (linear) and isoparaffins (branched). They can be liquid, pasty or solid. Preferably, $C_{20}$-$C_{36}$ paraffins are chosen. Advantageously, the $C_{20}$-$C_{36}$ paraffins represent at least 90% by weight of all the paraffins of the composition. Better still, the $C_{22}$-$C_{32}$ paraffins represent at least 90% by weight of all the paraffins of the composition.

Preferably, the $C_{20}$-$C_{36}$ paraffins represent at least 95% by weight of all the paraffins of the composition. Better still, the $C_{22}$-$C_{32}$ paraffins represent at least 95% by weight of all the paraffins of the composition.

The paraffins are introduced into the aqueous composition in amounts ranging from 50 to 10 000 ppm by weight of paraffins, with respect to the amount of urea by weight, preferably from 150 to 5000 ppm, better still from 300 to 3000 ppm, more advantageously still from 300 to 1500 ppm.

For an aqueous urea solution with a concentration of urea of 32.5% by weight, the paraffins are introduced into the aqueous composition in amounts ranging from 15 to 3300 ppm by weight of paraffins, with respect to the weight of aqueous solution, preferably from 50 to 1500 ppm, better still from 100 to 1000 ppm, more advantageously still from 100 to 500 ppm.

The Surfactant System:

The aqueous composition advantageously comprises at least one surfactant system which makes it possible to keep the paraffin in dispersed form. The surfactant system makes it possible to form an emulsion of paraffin in water.

Preferably, the surfactant system comprises at least one nonionic surfactant.

First Alternative Form:

According to a first alternative form, the nonionic surfactant or surfactants are chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

Oxygen-comprising hydrocarbon molecule is understood to mean a chain consisting exclusively of carbon, hydrogen and oxygen atoms, it being possible for said chain to be linear or branched, cyclic, polycyclic or acyclic, saturated or unsaturated, and optionally aromatic or polyaromatic. An oxygen-comprising hydrocarbon chain can comprise a linear or branched part and a cyclic part. It can comprise an aliphatic part and an aromatic part.

According to the invention, the oxygen-comprising hydrocarbon molecules are advantageously saturated.

According to the invention, the oxygen-comprising hydrocarbon molecules advantageously comprise a linear part and a cyclic part.

The cyclic part can be monocyclic or polycyclic.

According to the invention, the carbons of the mono- or polyalkoxylated groups are not included in the oxygen-comprising $C_4$-$C_{20}$ hydrocarbon molecule.

Advantageously, the nonionic surfactants are chosen from oxygen-comprising $C_4$-$C_{10}$ hydrocarbon molecules comprising one or two furanose or pyranose rings, and one or more hydroxyl groups, at least one of the hydroxyl groups being substituted by a mono- or polyalkoxylated group.

Preferably, the surfactants employed exhibit a mean degree of alkoxylation ranging from 1 to 80, better still from 1 to 50, even better still from 5 to 25 and advantageously from 10 to 20.

Generally, the mono- or polyalkoxylated groups are formed by a condensation reaction of alkylene oxide with the cyclic molecule carrying hydroxyl functional groups. They can concern ethylene oxide groups, propylene oxide groups or mixtures of these monomers which form copolymers of ethylene oxide and of propylene oxide, optionally block polymers.

The grafting of alkoxylated groups to the hydroxyl functional groups can be carried out by a condensation reaction with a hydroxyl functional group or with several hydroxyl functional groups of the molecule, according to the number of hydroxyl functional groups present, their reactivity and the reaction conditions. In general, the mean degree of alkoxylation is defined as the number of moles of alkylene oxide which have been reacted with the molecule to be grafted.

The surfactant system can also comprise polyalkylene oxide polymers and copolymers, in particular polyethylene oxides, polypropylene oxides, copolymers of ethylene oxide and of propylene oxide, optionally block polymers, or mixtures of these polymers. These polymers are sometimes formed in parallel with the grafting of the alkylene oxides to the hydroxyl functional groups of the oxygen-comprising $C_4$-$C_{20}$ hydrocarbon molecule and remain as a mixture with these. The commercial products of the type of oxygen-comprising $C_4$-$C_{20}$ hydrocarbon molecule carrying hydroxyl functional groups grafted by alkylene oxides generally comprise minor amounts of these polyalkylene oxide polymers and copolymers.

Preferably, the nonionic surfactant or surfactants are chosen from mono- or polyalkoxylated sorbitans and mono- or polyalkoxylated isosorbides, and their mixtures. More preferably still, the nonionic surfactant or surfactants are chosen from mono- or polyethoxylated sorbitans and mono- or polyethoxylated isosorbides, and their mixtures. These can be represented by the following formulae (I) and (II):

Ethoxylated Sorbitans:

(I)

with m, n, p and q, which are identical or different, integers ranging from 0 to 20, the sum m+n+p+q ranging from 1 to 80, preferably from 1 to 50.

Ethoxylated isosorbides:

(II)

with m and n, which are identical or different, integers ranging from 0 to 20, the sum m+n ranging from 1 to 40.

Preferably, the mono- or polyethoxylated sorbitans and the mono- or polyethoxylated isosorbides employed exhibit a mean degree of alkoxylation ranging from 1 to 50, advantageously from 5 to 25 and more preferably still from 10 to 20.

The alkoxylated oxygen-comprising $C_4$-$C_{20}$ hydrocarbon molecules, in particular the mono- or polyethoxylated sorbitans and the mono- or polyethoxylated isosorbides, and their mixtures, are advantageously introduced into the aqueous composition in amounts ranging from 1% to 70% by weight, with respect to the total weight of paraffins in the composition, better still from 1% to 50%, preferably from 5% to 40% and even better still from 10% to 30%.

According to this alternative form, the composition in addition advantageously comprises at least one or more emulsion stabilizers. In a known way, these emulsion stabilizers can be chosen in particular from saturated or unsaturated $C_8$-$C_{30}$ fatty acids, and their mixtures.

The fatty acid or acids can be saturated or unsaturated and can be linear or branched, and their number of carbons can be from 8 to 30, preferably from 10 to 24. The fatty acid can, for example, be a saturated fatty acid, such as n-caproic acid, caprylic acid, n-capric acid, lauric acid, myristic acid, palmitic acid, stearic acid, isostearic acid or arachidic acid, or an unsaturated fatty acid, such as palmitoleic acid, oleic acid, linoleic acid, linolenic acid, arachidonic acid or docosahexaenoic acid. Stearic acid, myristic acid and palmitic acid are examples of preferred fatty acids. Preferably, the emulsion stabilizer is chosen from mixtures of $C_{10}$-$C_{24}$ fatty acids, more preferably still $C_{12}$-$C_{20}$ fatty acids.

Advantageously, the invention employs a mixture of fatty acids comprising stearic acid, myristic acid and palmitic acid. Preferably, the invention employs a mixture of fatty acids essentially composed of stearic acid, myristic acid and palmitic acid.

The emulsion stabilizers are advantageously introduced into the aqueous composition in amounts ranging from 1% to 50% by weight, with respect to the total weight of paraffins in the composition, preferably from 5% to 40%, better still from 10% to 30%.

According to this first alternative form, preferably, the surfactant system is essentially composed of:
  one or more oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group,
  one or more emulsion stabilizers chosen from $C_8$-$C_{30}$ fatty acids and their mixtures.

More preferably still, according to this alternative form, the surfactant system is essentially composed of:

one or more molecules chosen from mono- or polyethoxylated sorbitans and mono- or polyethoxylated isosorbides, one or more emulsion stabilizers chosen from $C_{10}$-$C_{24}$ fatty acids and their mixtures.

Advantageously, according to this alternative form, the surfactant system is essentially composed of:

one or more molecules chosen from mono- or polyethoxylated sorbitans of formula (I) and mono- or polyethoxylated isosorbides of formula (II), as defined above, one or more emulsion stabilizers chosen from $C_{12}$-$C_{20}$ fatty acids and their mixtures.

Second Alternative Form:

According to a second alternative form, the nonionic surfactant or surfactants are chosen from esters of fatty acids and of oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group. The fatty acid can be grafted to a hydroxyl group of the ring or at the end of an alkoxylated chain.

According to the invention, the oxygen-comprising hydrocarbon molecules are advantageously saturated.

According to the invention, the oxygen-comprising hydrocarbon molecules advantageously comprise a linear part and a cyclic part.

The cyclic part can be monocyclic or polycyclic.

According to the invention, the carbons of the mono- or polyalkoxylated groups are not included in the oxygen-comprising $C_4$-$C_{20}$ hydrocarbon molecule.

Advantageously, the nonionic surfactants are chosen from esters of fatty acids and of oxygen-comprising $C_4$-$C_{10}$ hydrocarbon molecules comprising one or two furanose or pyranose rings, and one or more hydroxyl groups, at least one of the hydroxyl groups being substituted by a mono- or polyalkoxylated group. Preferably, the surfactants employed exhibit a mean degree of alkoxylation ranging from 1 to 80, better still from 1 to 50, even better still from 5 to 25 and advantageously from 10 to 20.

Generally, the mono- or polyalkoxylated groups are formed by a condensation reaction of alkylene oxide with the cyclic molecule carrying hydroxyl functional groups. They can concern ethylene oxide groups, propylene oxide groups or mixtures of these monomers which form copolymers of ethylene oxide and of propylene oxide, optionally block polymers.

The grafting of alkoxylated groups to the hydroxyl functional groups can be carried out by a condensation reaction with a hydroxyl functional group or with several hydroxyl functional groups of the molecule, according to the number of hydroxyl functional groups present, their reactivity and the reaction conditions. In general, the mean degree of alkoxylation is defined as the number of moles of alkylene oxide which have been reacted with the molecule to be grafted.

The surfactant system can also comprise polyalkylene oxide polymers and copolymers, in particular polyethylene oxides, polypropylene oxides, copolymers of ethylene oxide and of propylene oxide, optionally block polymers, or mixtures of these polymers. These polymers are sometimes formed in parallel with the grafting of the alkylene oxides to the hydroxyl functional groups of the oxygen-comprising $C_4$-$C_{20}$ hydrocarbon molecule and remain as a mixture with these. The commercial products of the type of oxygen-comprising $C_4$-$C_{20}$ hydrocarbon molecule carrying hydroxyl functional groups grafted by alkylene oxides generally comprise minor amounts of these polyalkylene oxide polymers and copolymers.

The surfactant system can optionally comprise minor amounts of the esters of fatty acids and of these polyalkylene oxide polymers and copolymers.

The number of molecules of fatty acids which have reacted with the oxygen-comprising hydrogen-comprising $C_4$-$C_{20}$ molecule can be greater than 1. The ester can thus be a monoester, a diester, a triester or a tetraester. In the case where the molecule is a polyester, separate fatty acid groups may have reacted with separate hydroxyl groups. Preferably, the ester is a monoester.

The fatty acid fragment of the ester of fatty acid and of alkoxylated sorbitan can be saturated or unsaturated and can be linear or branched, and its number of carbons can be from 8 to 30, preferably from 10 to 24, better still from 12 to 20. The fatty acid can, for example, be a saturated fatty acid, such as n-caproic acid, caprylic acid, n-capric acid, lauric acid, myristic acid, palmitic acid, stearic acid, isostearic acid or arachidic acid, or an unsaturated fatty acid, such as palmitoleic acid, oleic acid, linoleic acid, linolenic acid, arachidonic acid or docosahexaenoic acid. Stearic acid, myristic acid and palmitic acid are examples of preferred fatty acids.

Advantageously, the invention employs a mixture of esters of fatty acids based on a mixture of acids comprising stearic acid, myristic acid and palmitic acid. Preferably, the invention employs a mixture of esters of fatty acids based on a mixture of acids consisting of stearic acid, myristic acid and palmitic acid.

According to this alternative form, preferably, the nonionic surfactant or surfactants are chosen from esters of fatty acids and of mono- or polyalkoxylated sorbitans or of mono- or polyalkoxylated isosorbides.

Preferably, the esters of fatty acids and of mono- or polyalkoxylated sorbitans and the mono- or polyalkoxylated isosorbides employed exhibit a mean degree of alkoxylation ranging from 1 to 80, better still from 1 to 50, advantageously from 5 to 25 and advantageously from 10 to 20.

According to this alternative form, more advantageously still, the nonionic surfactant or surfactants are chosen from esters of fatty acids and of mono- or polyethoxylated sorbitans or of mono- or polyethoxylated isosorbides.

These molecules are represented by the formulae (III) and (IV) below:

Esters of fatty acids and of ethoxylated sorbitans:

(III)

with m, n, p and q, which are identical or different, integers ranging from 0 to 20, the sum m+n+p+q ranging from 1 to 80, preferably from 1 to 50, R1, R2, R3 and R4 independently representing a hydrogen atom or a $C_8$-$C_{30}$ alkylcarboxyl group, at least one of R1, R2, R3 and R4 being distinct from H.

Esters of fatty acids and of ethoxylated isosorbides:

(IV)

with m and n, which are identical or different, integers ranging from 0 to 20, the sum m+n ranging from 1 to 40; and R1 and R2 independently representing a hydrogen atom or a $C_8$-$C_{30}$ alkylcarboxyl group, at least one of R1 and R2 being distinct from H.

Such molecules are commercially available, in particular under the Polysorbate name or under the Radiasurf® brand sold by Oleon.

The esters of fatty acids and of alkoxylated oxygen-comprising $C_4$-$C_{20}$ hydrocarbon molecules, in particular the esters of fatty acids and of mono- or polyethoxylated sorbitans and of mono- or polyethoxylated isosorbides, and their mixtures, are advantageously introduced into the aqueous composition in amounts ranging from 1% to 70% by weight, with respect to the total weight of paraffins in the composition, better still from 1% to 50%, preferably from 5% to 40% and even better still from 10% to 30%.

According to this second alternative form, preferably, the surfactant system is essentially composed of:

one or more esters of fatty acids and of oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

More preferably still, according to this alternative form, the surfactant system is essentially composed of:

one or more esters of fatty acids and of mono- or polyethoxylated sorbitans or of mono- or polyethoxylated isosorbides.

Advantageously, according to this alternative form, the surfactant system is essentially composed of:

one or more molecules chosen from esters of fatty acids and of mono- or polyethoxylated sorbitans of formula (III) or of mono- or polyethoxylated isosorbides of formula (IV) as defined above.

Third Alternative Form:

According to a preferred embodiment, the composition comprises at least or better still is essentially composed of:

a nonionic surfactant chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group, an emulsion stabilizer chosen in particular from $C_8$-$C_{30}$ fatty acids, a nonionic surfactant chosen from esters of $C_8$-$C_{30}$ fatty acids and of oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

More preferably still, according to this alternative form, the composition comprises at least or better still is essentially composed of:

a nonionic surfactant chosen from mono- or polyethoxylated sorbitans and mono- or polyethoxylated isosorbides, an emulsion stabilizer chosen in particular from $C_{10}$-$C_{24}$ fatty acids, a nonionic surfactant chosen from esters of $C_{10}$-$C_{24}$ fatty acids and of mono- or polyethoxylated sorbitans or of mono- or polyethoxylated isosorbides.

Advantageously, according to this alternative form, the composition comprises at least or better still is essentially composed of:

a nonionic surfactant chosen from mono- or polyethoxylated sorbitans of formula (I) and mono- or polyethoxylated isosorbides of formula (II), an emulsion stabilizer chosen in particular from $C_{12}$-$C_{20}$ fatty acids, a nonionic surfactant chosen from esters of $C_{12}$-$C_{20}$ fatty acids and of mono- or polyethoxylated sorbitans of formula (III) or of mono- or polyethoxylated isosorbides of formula (IV).

Optionally, in view of the process for the synthesis of these molecules, the presence of ethylene oxide and propylene oxide polymers and copolymers, and also esters of fatty acids and of such polymers, can be envisaged.

The surfactants and stabilizers are employed in amounts sufficient to make possible the dispersion of the paraffin in the aqueous composition. A person skilled in the art knows how to adjust the dosage according to the paraffin chosen and its amount in the composition.

Advantageously, the combined surfactants and stabilizers represent from 1% to 100% by weight, with respect to the total weight of paraffin(s) in the composition, better still from 5% to 50% by weight.

Fourth Alternative Form:

According to another preferred embodiment, the composition comprises at least or better still is essentially composed of:

a nonionic surfactant chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group, an emulsion stabilizer chosen in particular from $C_8$-$C_{30}$ fatty acids, a nonionic surfactant chosen from esters of $C_8$-$C_{30}$ fatty acids and of oxygen-comprising $C_4$-$C_{20}$ hydrocarbon molecules comprising one or two furanose or pyranose rings, and one or more hydroxyl groups.

More preferably still, according to this alternative form, the composition comprises at least or better still is essentially composed of:

a nonionic surfactant chosen from mono- or polyethoxylated sorbitans and mono- or polyethoxylated isosorbides, an emulsion stabilizer chosen in particular from $C_{10}$-$C_{24}$ fatty acids, a nonionic surfactant chosen from esters of $C_{10}$-$C_{24}$ fatty acids and of sorbitans or of isosorbides.

Esters of fatty acids and of sorbitans:
They can be represented by the formula (V) below:

in which R1, R2, R3 and R4 independently represent a hydrogen atom or a $C_8$-$C_{30}$ alkylcarboxyl group, at least one of R1, R2, R3 and R4 being distinct from H.

Esters of fatty acids and of isosorbides:
They can be represented by the formula (VI) below:

in which R1 and R2 independently represent a hydrogen atom or a $C_8$-$C_{30}$ alkylcarboxyl group, at least one of R1 and R2 being distinct from H.

Advantageously, according to this alternative form, the composition comprises at least or better still is essentially composed of:
  a nonionic surfactant chosen from mono- or polyethoxylated sorbitans of formula (I) and mono- or polyethoxylated isosorbides of formula (II),
  an emulsion stabilizer chosen in particular from $C_{12}$-$C_{20}$ fatty acids,
  a nonionic surfactant chosen from esters of $C_{12}$-$C_{20}$ fatty acids and of sorbitans of formula (V) or of isosorbides of formula (VI).

Optionally, in view of the process for the synthesis of these molecules, the presence of ethylene oxide and propylene oxide polymers and copolymers can be envisaged.

The surfactants and stabilizers are employed in amounts sufficient to make possible the dispersion of the paraffin in the aqueous composition. A person skilled in the art knows how to adjust the dosage according to the paraffin chosen and its amount in the composition.

Advantageously, the combined surfactants and stabilizers represent from 1% to 100% by weight, with respect to the total weight of paraffin(s) in the composition, better still from 5% to 50% by weight.

The Composition:
The aqueous composition can contain one or more other additives than the polyfunctional additives as defined above, such as, for example, cosolvents intended to promote the dissolution of the surfactant or surfactants in the aqueous composition. The aqueous composition is prepared in the usual way by mixing its constituents, preferably at ambient temperature, typically in a temperature range extending generally from 10° C. to 60° C.

The polyfunctional additives which are soluble in water, more particularly at ambient temperature, are generally preferred. For reasons of speed of mixing of the constituents of the aqueous solution, it is preferable to avoid pasty and/or solid components.

Preferably, the aqueous compositions correspond to the standard ISO 22241-1 as regards the amounts shown in table 1 of said standard: aldehydes, insoluble matter, phosphate, calcium, iron, copper, zinc, chromium, nickel, aluminum, sodium and potassium. Generally, the aqueous compositions contain any element and/or component in an amount such that it is not liable to be a poison of the SCR catalyst.

According to an alternative form, the aqueous composition is a concentrated composition comprising the precursor of said reducing agent for NOx, in particular urea, the paraffin(s) and the surfactant(s) and stabilizer(s), in the proportions set out above, which composition can be diluted with water before it is employed.

According to another alternative form, the aqueous composition is a composition comprising the precursor of said reducing agent for NOx, in particular urea, the paraffin(s) and the surfactant(s) and stabilizer(s), in the proportions set out above, the concentration of precursor of said reducing agent for NOx being that recommended by an injection into the SCR system. Such a composition is injected without predilution. According to this alternative form, preferably, the aqueous composition is a composition comprising urea, the paraffin(s) and the surfactant(s) and stabilizer(s), in the proportions set out above, the concentration of urea being 32.5%.

According to another preferred alternative form, the aqueous composition is prepared from a preformulated aqueous urea solution, such as, for example, a commercial composition known under the name of AdBlue® comprising 32.5% by weight of urea, and from a preformulated aqueous paraffin(s) composition. According to this alternative form, the aqueous paraffin composition comprises the paraffin(s) and the surfactant system described above. The aqueous paraffin composition advantageously exhibits a concentration of active materials of 10% to 90% by weight, with respect to the total weight of the composition, the active materials including the paraffin or paraffins and the surfactant or surfactants as have been defined above and in the relative proportions which have been defined above. Preferably, according to this alternative form, the aqueous paraffin composition exhibits a concentration of active materials of 25% to 75% by weight, with respect to the total weight of the composition. The mixing of the two compositions is carried out before the injection into the SCR system.

According to this alternative form, as the amounts of paraffin and of surfactant are low in comparison with the remainder of the composition, the latter can be defined as an aqueous composition comprising substantially 32.5% by weight of urea.

The same reasoning might be followed starting from a preformulated aqueous solution of another precursor of said reducing agent for NOx.

According to a preferred embodiment, the composition of the invention is essentially composed of:
  water,
  a reducing agent for NOx or a precursor of a reducing agent for NOx,
  one or more paraffins dispersed in the aqueous phase, said paraffins representing from 50 to 10 000 ppm by weight, with respect to the weight of reducing agent for NOx or with respect to the weight of precursor of reducing agent for NOx,
  one or more surfactants and emulsion stabilizers, the combined surfactants and emulsion stabilizers representing from 1% to 100% by weight, with respect to the total weight of paraffin(s) in the composition.

According to a more preferred embodiment, the composition of the invention is essentially composed of:
- water,
- urea,
- one or more paraffins dispersed in the aqueous phase, said paraffins representing from 50 to 10 000 ppm by weight, with respect to the weight of urea,
- one or more surfactants and emulsion stabilizers, the combined surfactants and emulsion stabilizers representing from 1% to 100% by weight, with respect to the total weight of paraffin(s) in the composition.

Implementation Process:

A further subject matter of the invention is the use of the aqueous composition according to the invention in any spray device targeted at the post-treatment of exhaust gases, more particularly SCR devices.

The invention also relates to a process for the treatment of an exhaust stream from an engine, this process comprising the injection of a composition based on a reducing agent for NOx or on a precursor of said agent, in particular based on urea, as has been described above. The composition of the invention is injected upstream with respect to the positioning of the SCR device in the exhaust pipe. This process makes it possible to reduce deposits in the exhaust pipe, in particular deposits of cyanuric acid.

In addition, in comparison with compositions of the prior art, the process of the invention makes it possible to handle the composition, in particular to fill the tank, without foaming or with reduced foaming.

Finally, in comparison with compositions of the prior art, the process of the invention makes possible better control of the amount of reducing agent for NOx or of precursor of said agent injected. This is because, in the absence of foaming, only the aqueous composition is injected, whereas some previous compositions, by their foaming, promote the injection of air into the tank and result in inaccurate operation of the filling gauge.

The invention also relates to the use of an aqueous dispersion or emulsion or suspension of paraffin as defined above as additive in an aqueous solution of a reducing agent for NOx or an aqueous solution of precursor of said agent, in particular in an aqueous urea solution, for the purpose of employment in an SCR system. This use is targeted at reducing or preventing deposits in the SCR device while also reducing or preventing the foaming of the aqueous solution of reducing agent for NOx during the handling thereof, in particular during the introduction thereof into a tank. This use is also targeted at making possible better control of the amount of reducing agent for NOx or of precursor of said agent injected.

The examples below are given for the purpose of illustrating the characteristics of the invention but not of limiting the scope thereof.

Experimental Part:

In the experimental part, all the percentages are expressed by weight, with respect to the total weight of the composition.

I—Materials and Methods:

Preparation of the Compositions:

Use was made, as basis for the composition, of a commercial 32.5% by weight aqueous urea solution: AdBlue®.

This composition was additivated with different compositions in the amounts shown in table 2: on the one hand with an emulsion of paraffins (Emulsion P) and on the other hand with surfactant compositions of the prior art.

Emulsion P: aqueous emulsion comprising (as % by weight, with respect to the total weight of the emulsion)
- 50% of water,
- 42% of $C_{22}$-$C_{32}$ paraffins,
- approximately 8% of a mixture of polyoxyethylenated sorbitans and isosorbides, the distribution of the polyoxyethylenated chains being centered respectively on $C_{13}$ and $C_{16}$, of fatty acids consisting of stearic acid (C18:0), palmitic acid (C16:0) and myristic acid (C14:0) and stearic ester (C18:0) and palmitic ester (C16:0) of sorbitan.

Polyaldo™ TMSH KFG (3-1-SH): product of the reaction of a triglycerol with saturated $C_{16}$-$C_{18}$ and unsaturated $C_{18}$ fatty acids, sold by Lonza Marlipal O13/30®: $C_{13}$-oxo alcohol (isotridecanol+3 EO/mol), sold by Sasol Mixture of 70% Marlipal® O13/120+30% Marlipal® O13/30 (sold by Sasol): 30% $C_{13}$-oxo alcohol (isotridecanol+3 EO/mol)+70% $C_{13}$-oxo alcohol (isotridecanol+12 EO/mol)

Figure 1:
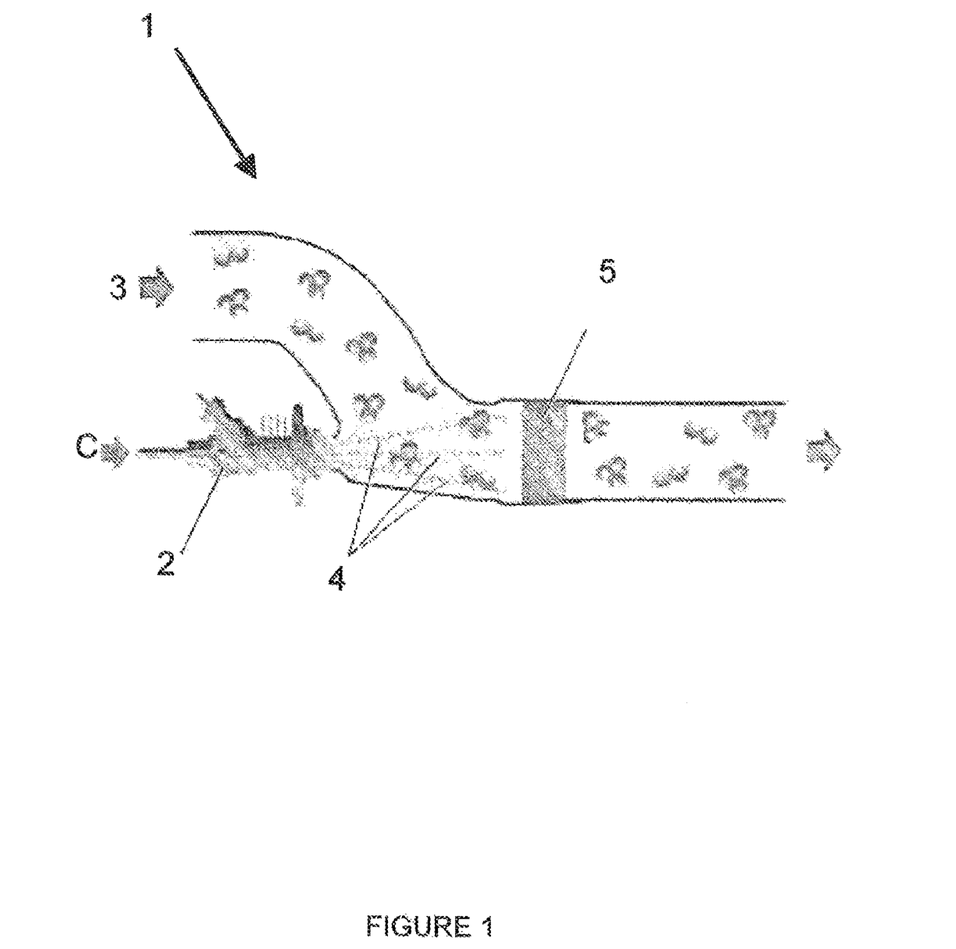
FIG. 1: diagrammatic representation of an SCR test bed.

Radiasurf 7157®: ethoxylated (20 EO) sorbitan monostearate, HLB=15, sold by Oleon Radiasurf 7137®: ethoxylated (20 EO) sorbitan monolaurate, sold by Oleon Proppabort: alkoxylated fatty alcohol, sold by Proppabort AB Observation and Measurement of the Deposits:

The tests were carried out on an SCR test bed 1, the configuration of which is represented in FIG. 1. The composition C is sprayed via an injector 2 located slightly set back with respect to the stream 3 of the exhaust gases. The droplets of solution 4 will subsequently be impacted on the mixer 5, in order to facilitate the homogenization thereof and the hydrolysis reaction of the urea in the stream of hot gases. The exhaust line is fed with air by a hot air gun (not represented); the temperature of the gases and their flow rate are controlled. Thermocouples (not represented) placed at the injector, in the line outlet and close to the line make it possible to monitor the thermal conditions during the test.

The operating conditions of the test are summarized in table 1 below:

TABLE 1

| Operating conditions selected for the SCR test bed | |
|---|---|
| Duration [h] | 2.5 |
| Airflow rate [L/min] | 500 |
| AdBlue ® flow rate [g/h] | 60 |
| Injector temperature [° C.] | 250 |

In order to evaluate the performance of a product, the weight of deposits collected over the following two regions: the "injector" (nose/injection nozzle holder) region and the "mixing" (upstream/mixer/downstream) region, was compared.

The deposits were thus collected and weighed over the "injector" and "mixing" regions of the SCR line. The total of the deposits collected for each test was calculated.

Figure 2:
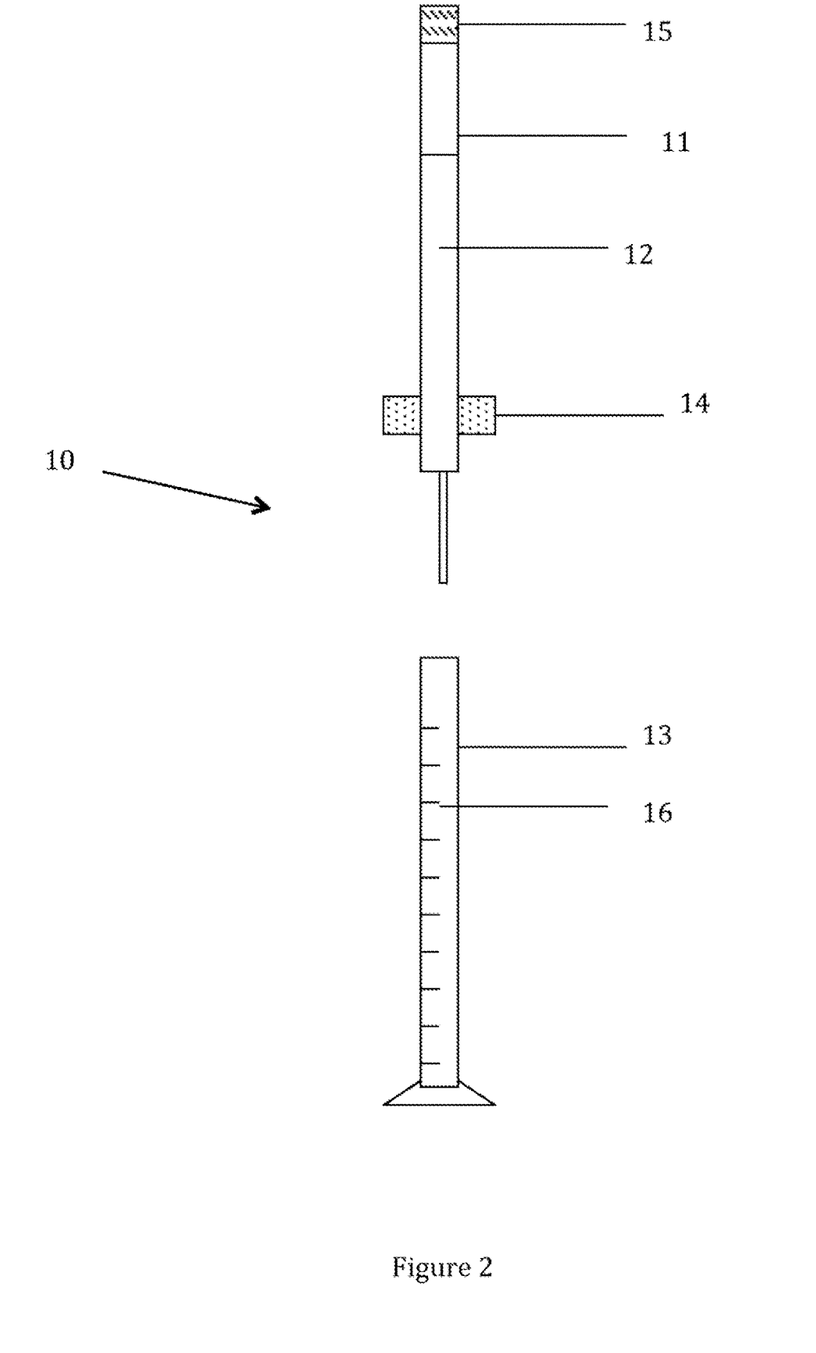
FIG. 2: diagrammatic representation of a device for evaluation of the foaming.

Evaluation of the Foaming:

The method is based on the use of a device 10 comprising a tank 11 (injection column) in which the product 12 is stored under pressure, a 250-ml graduated glass measuring cylinder 13, a detection cell 14 of photoelectric type, a solenoid valve 15, which controls the opening and the closing of the tank, and a stopwatch (not represented). The method consists in injecting an amount of product 12 (100 ml) at a pressure of 400 millibar into the graduated measuring cylinder 13. The detection cell 14 detects the moment when the 100 ml of product 12 initially present in the injection column 11 have emptied into the measuring cylinder 13. The solenoid valve 15 is closed and the stopwatch is started. The volume of foam formed is located visually using the graduations 16 present on the measuring cylinder 13. The time at the end of which the foam has completely disappeared is also noted. The test is halted after 300 seconds if foam is still present.

II—Tests:

The tests carried out are reported in table 2 below. The reference example was carried out with a commercial 32.5% aqueous urea solution AdBlue®. The other examples were carried out with the same commercial 32.5% aqueous urea solution AdBlue® to which the various additives mentioned were added.

Tests C1 and C2 are according to the invention. Tests D1 to D6 are comparative.

TABLE 2

Formulations produced

| Test No. | Additive | Amount of additive as active material (ppm) | Amount of additive (ppm) | Observations |
|---|---|---|---|---|
| Ref. (*) | — | — | — | Light and clear |
| C1 | Emulsion P | 250 | 500 | Opalescent |
| C2 | Emulsion P | 500 | 1000 | Opalescent |
| D1 | Polyaldo ™ TMSH KFG (3-1-SH) | 500 | 500 | Cloudy |
| D2 | Marlipal O13/30 ® | 500 | 500 | Light and clear |
| D3 | Marlipal ® (70% O13/120 + 30% O13/30) | 500 | 500 | Light and clear |
| D4 | Radiasurf 7157 ® | 500 | 500 | Light and clear |
| D5 | Radiasurf 7137 ® | 500 | 500 | Light and clear |
| D6 | Proppabort | 1000 | 1000 | Slightly cloudy |

(*) Adblue ® 32.5% aqueous urea solution

III—Results:

The results of the tests are reported in table 3 below:

TABLE 3

Results of the tests

| Test No. | Time for foam disappearance (s) | Foam volume [mL] | Total amount of deposits | Amount deposits mixing | Amount deposits injector |
|---|---|---|---|---|---|
| Ref. (*) | 0 | 0 | 884 | 803 | 81 |
| C1 | 14 | 30 | 221 | 136 | 85 |
| C2 | 198 | 30 | 204 | 127 | 77 |
| D1 | >300 | 40 | 222 | 174 | 48 |
| D2 | 150 | 40 | 367 | 251 | 116 |
| D3 | >300 | 68 | 228 | 77 | 151 |
| D4 | >300 | 92 | 342 | 241 | 101 |
| D5 | >300 | 90 | 463 | 356 | 107 |
| D6 | >300 | 30 | 537 | 379 | 158 |

It is found that the examples according to the invention C1 and C2 exhibit a reduced amount of deposits with respect to the reference and with respect to the majority of the comparative examples (D2 to D6). In addition, the examples according to the invention exhibit little foaming, and this rapidly disappears, in contrast to the compositions of the prior art.

The invention claimed is:

1. An aqueous composition comprising at least one reducing agent for NOx or one precursor of a reducing agent for NOx, and at least one paraffin dispersed in the aqueous phase, said paraffin representing from 50 to 10 000 ppm by weight, with respect to a weight of reducing agent for NOx or with respect to a weight of precursor of reducing agent for NOx, wherein the precursor of the reducing agent for NOx is urea, and wherein $C_{20}$-$C_{36}$ parraffins represent at least 90% by weight, with respect to a total weight of paraffins in the composition.

2. The composition as claimed in claim 1, wherein the precursor of the reducing agent for NOx is urea.

3. The composition as claimed in claim 1, wherein the $C_{20}$-$C_{36}$ paraffins represent at least 90% by weight, with respect to the total weight of paraffins in the composition.

4. The composition as claimed in claim 1, which comprises at least one surfactant.

5. The composition as claimed in claim 4, which comprises at least one nonionic surfactant.

6. The composition as claimed in claim 5, which comprises at least one nonionic surfactant chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

7. The composition as claimed in claim 6, wherein the nonionic surfactant is chosen from polyethoxylated sorbitans and polyethoxylated isosorbides.

8. The composition as claimed in claim 6, wherein the oxygen-comprising $C_4$-$C_{20}$ hydrocarbon surfactants comprising one or two furanose or pyranose rings, and one or more mono- or polyalkoxylated hydroxyl groups, are present in amounts ranging from 1% to 70% by weight, with respect to the total weight of paraffins in the composition.

9. The composition as claimed in claim 4, which comprises at least one stabilizing agent for the emulsions.

10. The composition as claimed in claim 9, which additionally comprises at least one stabilizing agent for emulsions chosen from fatty acids.

11. The composition as claimed in claim 10, wherein the fatty acid is present in amounts ranging from 1% to 50% by weight, with respect to the total weight of paraffins in the composition.

12. The composition as claimed in claim 5, which comprises at least one nonionic surfactant chosen from esters of fatty acids and of oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

13. The composition as claimed in claim 12, wherein the nonionic surfactant or surfactants are chosen from esters of fatty acids and of mono- or polyethoxylated sorbitans and esters of fatty acids and of mono- or polyethoxylated isosorbides.

14. The composition as claimed in claim 12, wherein the esters of fatty acids and of oxygen-comprising $C_4$-$C_{20}$ hydrocarbon molecules comprising one or two furanose or pyranose rings, and one or more mono- or polyalkoxylated hydroxyl groups, are present in amounts ranging from 1% to 70% by weight, with respect to the total weight of paraffins in the composition.

15. The composition as claimed in claim 4, which comprises at least:
   a nonionic surfactant chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group,
   an emulsion stabilizer chosen from $C_8$-$C_{30}$ fatty acids, and
   a nonionic surfactant chosen from esters of fatty acids and of oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group.

16. The composition as claimed in claim 4, which comprises at least:
   a nonionic surfactant chosen from oxygen-comprising $C_4$-$C_{20}$ hydrocarbon molecules comprising one or two furanose or pyranose rings, and one or more hydroxyl groups, at least one of the hydroxyl groups being substituted by a mono- or polyalkoxylated group,
   an emulsion stabilizer chosen from $C_8$-$C_{30}$ fatty acids, and
   a nonionic surfactant chosen from esters of fatty acids and of oxygen-comprising $C_4$-$C_{20}$ hydrocarbon molecules comprising one or two furanose or pyranose rings, and one or more hydroxyl groups.

17. The composition as claimed in claim 4, wherein the combined surfactants and emulsion stabilizers represent from 1% to 100% by weight, with respect to the total weight of paraffin(s) in the composition.

18. A process for the treatment of exhaust gases in an internal combustion engine equipped with an SCR system, said process comprising at least one stage of introduction of a composition as claimed in claim 1 into the SCR line, upstream of the SCR system.

19. The process as claimed in claim 18, for averting, limiting or preventing the formation of deposits in an SCR exhaust line.

20. The process as claimed in claim 18, for reducing the deposits in the SCR line.

* * * * *